Nov. 26, 1957  W. F. JOHNSTON  2,814,230
PIANO TEACHING DEVICE
Filed March 1, 1954  5 Sheets-Sheet 1
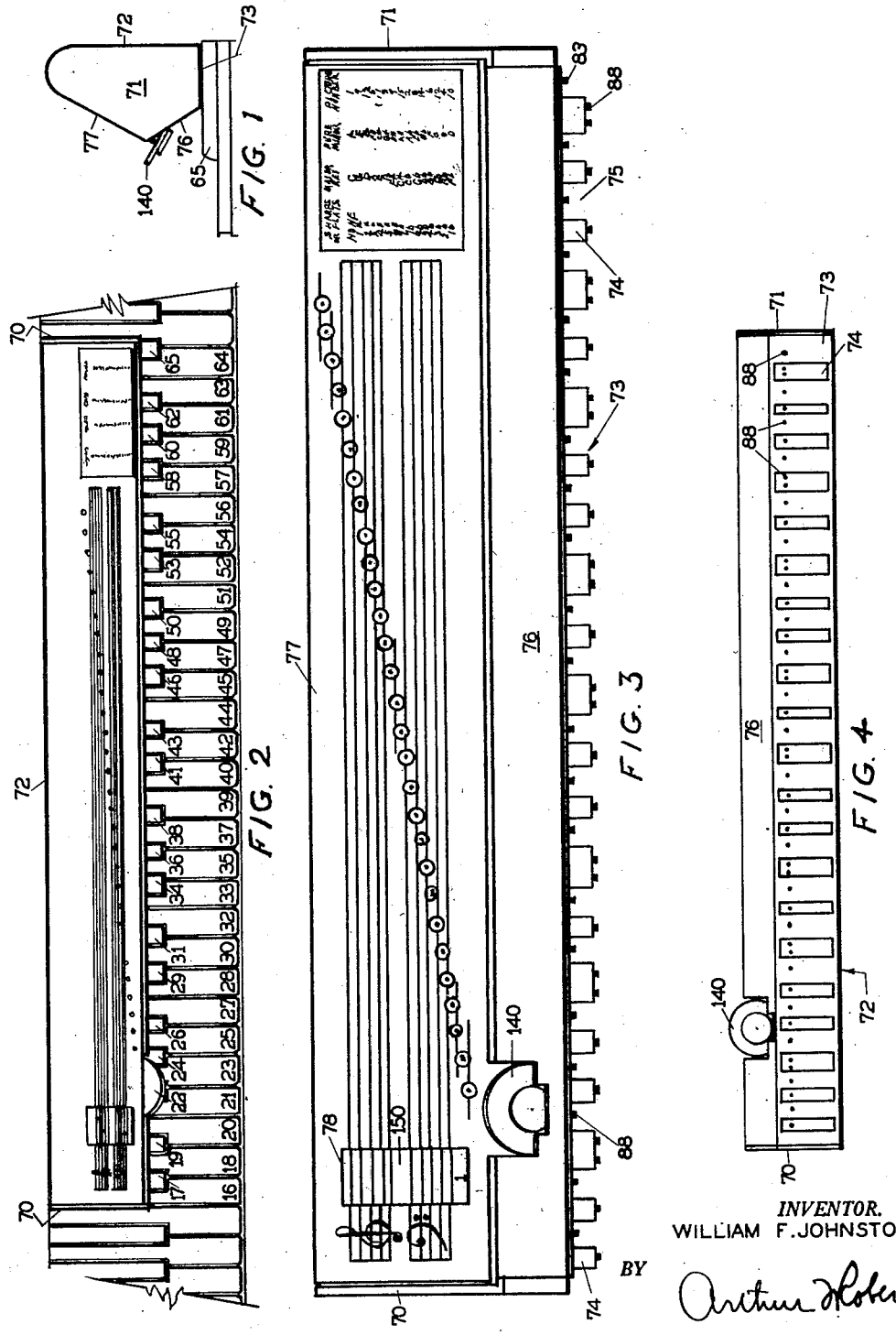
INVENTOR.
WILLIAM F. JOHNSTON
BY
Arthur Robert
ATTORNEY

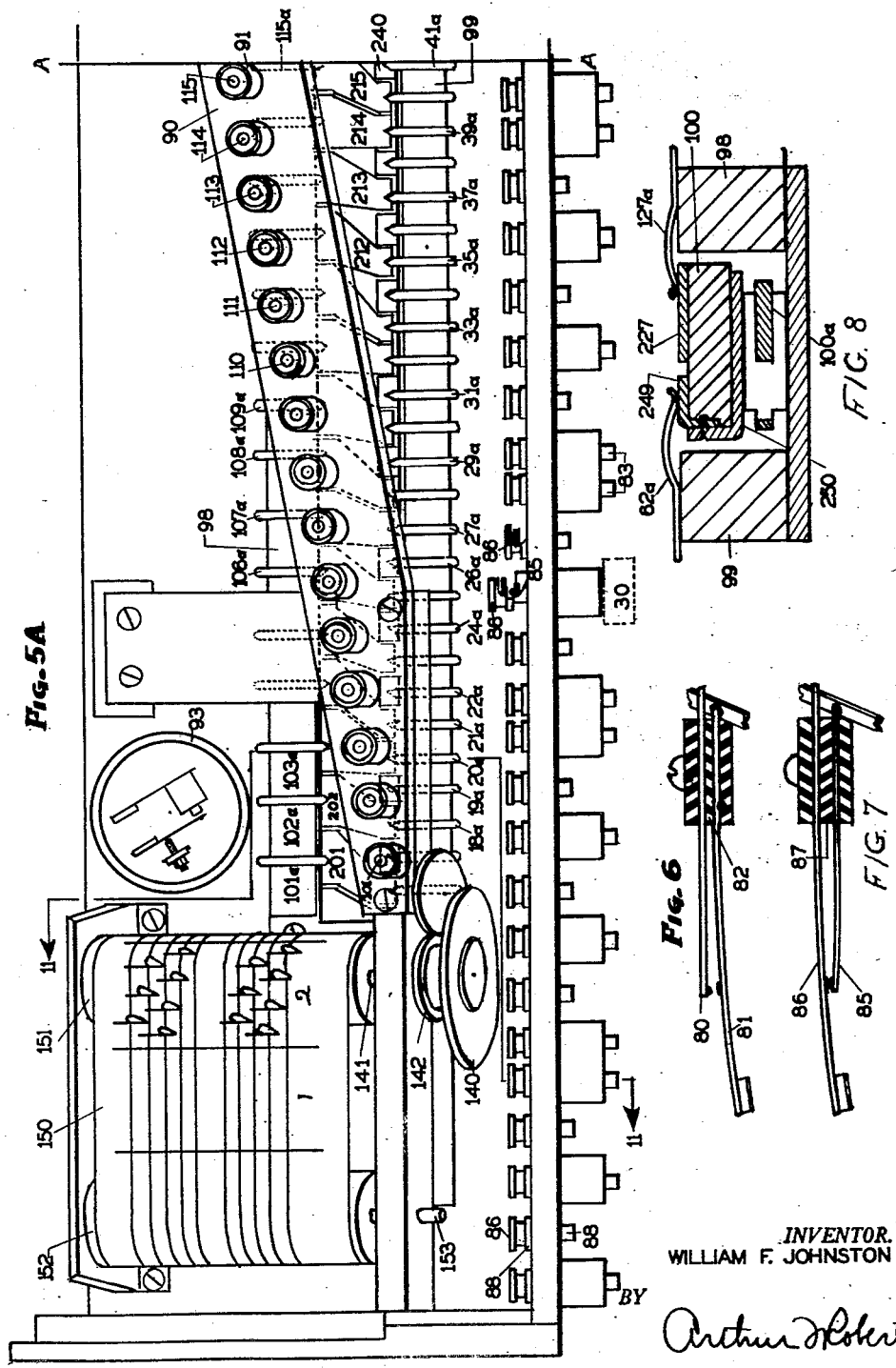

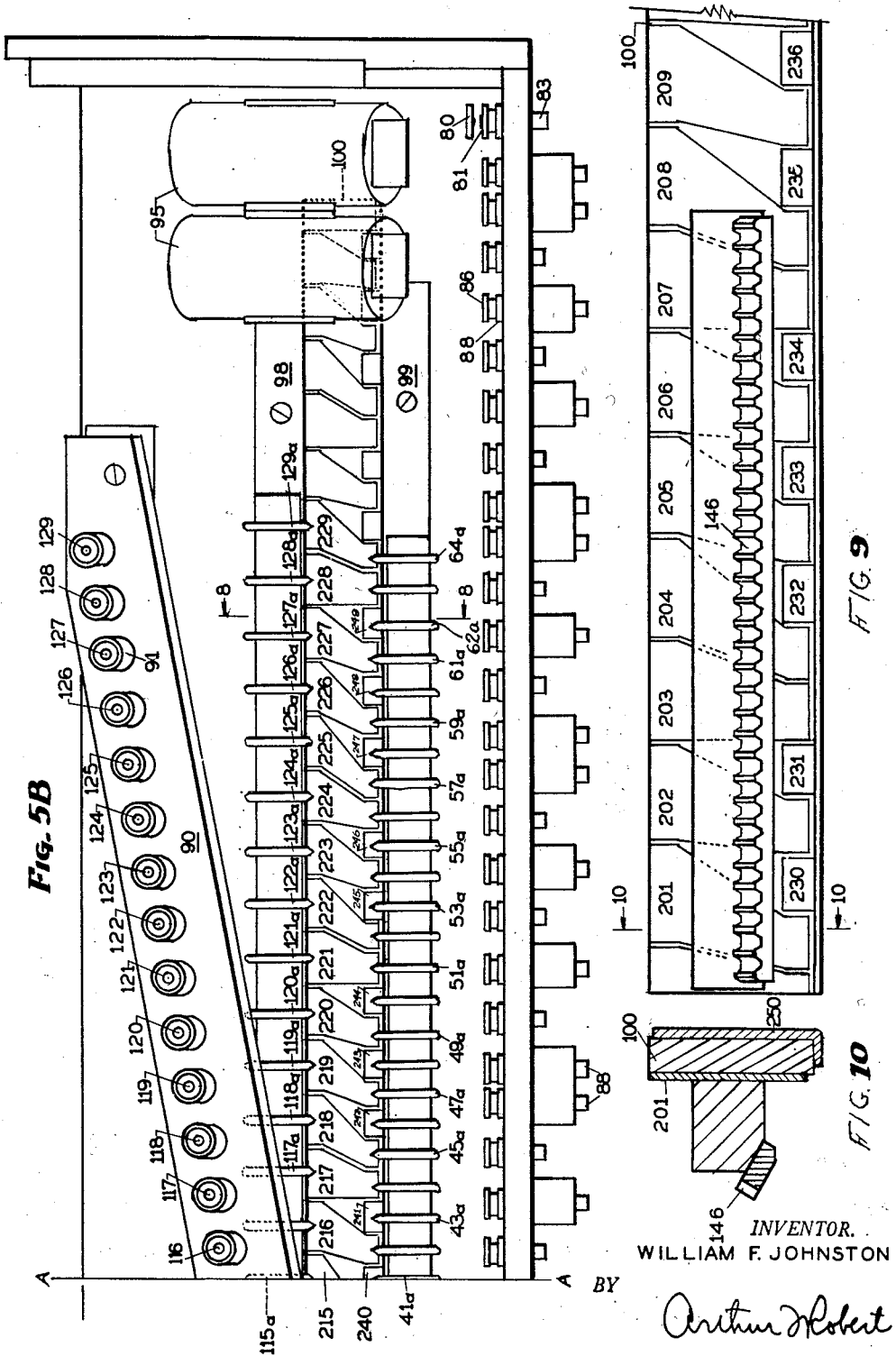

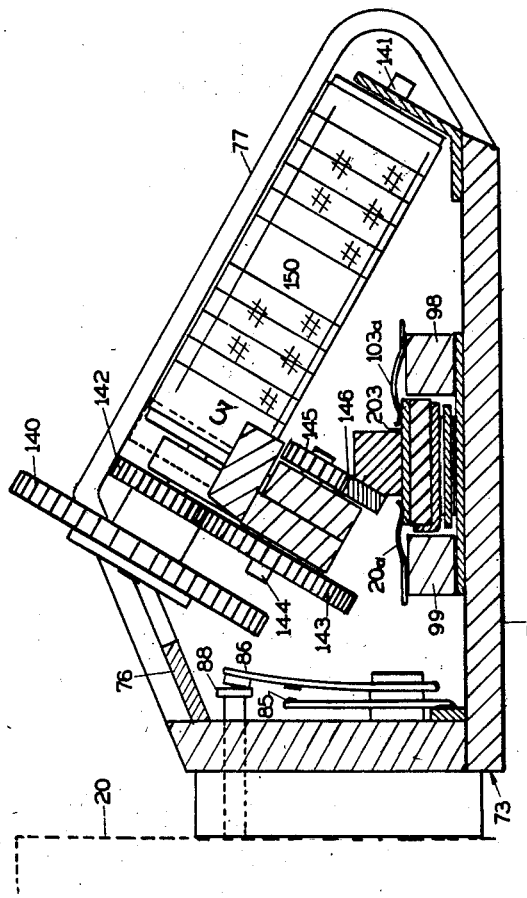

United States Patent Office 2,814,230
Patented Nov. 26, 1957

2,814,230
PIANO TEACHING DEVICE

William F. Johnston, New Albany, Ind.

Application March 1, 1954, Serial No. 412,983

18 Claims. (Cl. 84—478)

This invention relates to a piano teaching device and, more particularly, to a device which facilitates the teaching of piano.

The principal object of this invention is to provide a novel form of device to facilitate the teaching of piano.

An important object is to provide a device which, for any given key of music or diatonic scale, visually correlates the individual notes on a music scale or staff with their respective piano keys on the keyboard. In other words, this device correlates each note on the staff with its exact position on the keyboard.

Another object is to provide a device which, in any given key of music, visually correlates each line note and each space note on the music scale with the exact keyboard position for that note and which visually distinguishes between line notes on the one hand and space notes on the other and thus facilitates the teaching of chords, inversions, intervals and the like.

Another important object is to provide a device which, in any given key of music, warns the student when he makes a mistake.

A further object is to provide a device which may be set to any of a number of different major keys of music or diatonic scales and which, in each setting, not only visually correlates each staff note with the exact piano key for that particular note, but also warns the student when he strikes a piano key that does not correspond to a staff note for the given key of music.

Other objects are to provide a device which, among other things, facilitates an understanding by the student of the different keys of music and of the proper combination of piano keys for each different music key, trains the student to keep his eyes on the music, helps the student to read music more rapidly and accurately and shows the student where the sharps and flats occur in scales, chords and intervals.

The preferred embodiment of my invention resides in the combination of an alarm and a display panel, containing successive full line and space notes in an ascending scale over a desired range embracing one or more octaves, with circuit means operative, when set to a given key of music, not only to correlate each different note on the panel with the individual piano key for that particular note in the set key, but also to correlate the alarm with all of the remaining piano keys embraced within the range of said scale notes.

In the preferred embodiment: the alarm is of the audible type placed anywhere within the hearing range of the student; the display panel is placed before and in full view of a student seated at the piano; and the circuit means is operative to effect the correlation of each scale note with its piano key by illuminating that note when its key is depressed and to effect the correlation of the alarm with each of the remaining piano keys by sounding the alarm when any remaining piano key is depressed. The circuit means includes: a series of parallel circuits correlating notes with keys; and another series of auxiliary circuits correlating the alarm with the remaining keys.

The preferred embodiment also includes a selector switch which may be manually set to 15 different positions corresponding to the 15 different major keys of music or diatonic scales. In one position it provides switch contacts: in each parallel circuit, to effect the proper correlation of notes with keys; and, in each auxiliary circuit, to effect the proper combination of alarm with the remaining keys. When shifted to another music key position, these contacts, in both parallel and auxiliary circuits, are shifted to correlate the same notes with a new combination of piano keys and the same alarm with the new combination of remaining keys. Finally the preferred embodiment includes means for indicating each setting of the selector switch.

The preferred embodiment of my invention is illustrated in the accompanying drawings wherein:

Figures 1 and 2 are end elevational and top plan views, respectively, of my device as it appears on a piano keyboard;

Figures 3 and 4 are front elevational and bottom plan views respectively of the device;

Figures 5A and 5B are front elevational views of the left and right halves, respectively, with the lower front and the upper-front-and-top walls removed and the wiring omitted;

Figures 6 and 7 are detail views showing the master switch and one of the piano key switches, respectively;

Figure 8 is a sectional view taken along line 8—8 of Figure 5B;

Figure 9 is a plan view of the left end portion of the slide member of the selector mechanism;

Figure 10 is a section taken along line 10—10 of Figure 9;

Figure 11 is a sectional view taken along line 11—11 of Figure 5A;

Figure 12 is an enlarged view of the tabulation shown at the right of Figure 3;

Figure 13 is another tabulation showing, for each of a series of music keys, the relationship between one series of piano keys and the corresponding light signals, this tabulation showing the changes in that relationship with a change in the music key;

Figure 14 is a tabulation, similar to Figure 12, but showing, in place of signal lights, certain contacts in the light circuits for piano keys 16–17 and 28–29.

Figure 15:
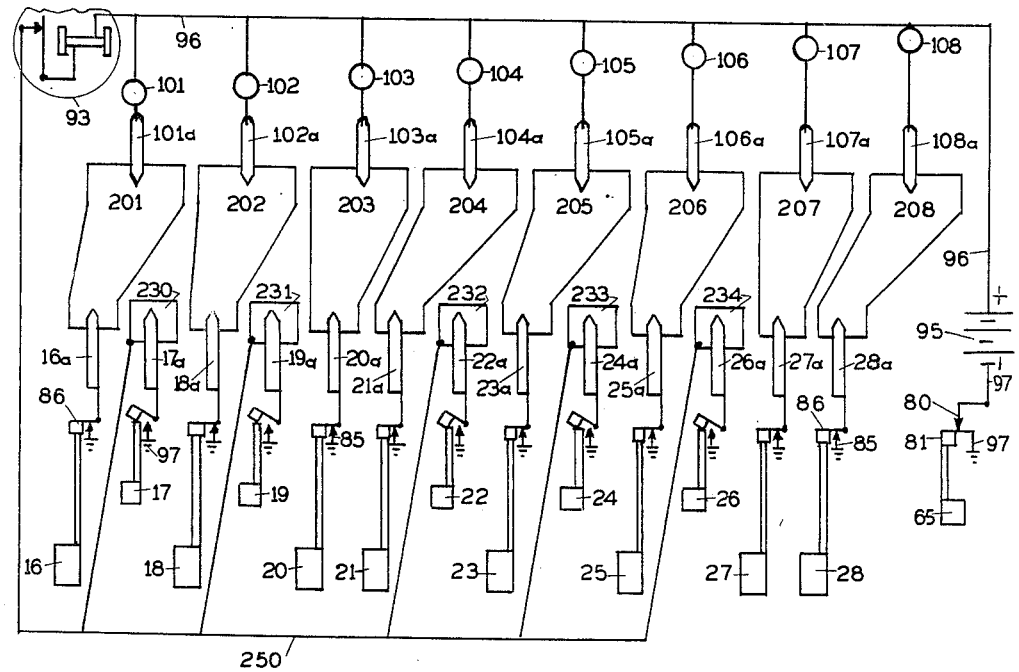
Figure 15 is a schematic view of the circuit arrangement for one octave.

At the outset it should be understood that there are 15 major keys of music, which are herein numbered from 1 to 15, see Figs. 12 an 14, that the present device may be set to any of 15 different positions, one for each major key of music, and that, for the sake of clarity, it is illustrated and described in its No. 1 position which corresponds to the major key of C.

It should also be understood that an octave, in any one of these 15 musical keys, embraces 7 notes plus 1. Thus, while each octave contains 8 successive notes, two successive octaves embrace 14 notes plus 1 or a total of 15 notes since the last note of one octave is the first note of the next octave. Each octave extends over 12 piano keys plus 1 or 13 keys so that, for one octave in a given key of music, 8 of these 13 piano keys represent proper musical notes while the remaining 5 piano keys represent improper or off-key notes.

With this understanding it may be noted that the present invention may be embodied in a device designed to embrace all 88 notes of a standard keyboard. However, since this device is primarily intended for use by the novice, it is unnecessary to extend it over more than, say, 4 octaves or 29 proper notes of any one music key involving approximately 49 piano keys. The embodiment illustrated in the drawing is, therefore, designed to embrace 29 successive proper notes which are included in a span of 49 successive piano keys. These keys begin with the 16th key from the left end of the standard keyboard and end with the 64th key. However, the embodiment illustrated also spans the 65th piano key for master switch control purposes which will be later explained. These numbered keys 16 through 65 are indicated in top plan Figure 2 showing the relationship of my device to the piano keyboard.

The illustrated embodiment of my invention, in somewhat specific language, comprises: a housing adapted to be operatively positioned over and to rest upon piano keys ranging from 16 through 65; a series of 49 switches carried by the housing and adapted to be operatively positioned in relation to a corresponding series of 49 successive piano keys embracing 4 successive octaves, each operatively positioned switch being so controlled by its corresponding piano key that it will move to a closed position when its corresponding key is depressed and return to its normally open position when its piano key returns to its original position; a scale of successive normally inoperative electrically controlled note signals corresponding to successive notes in a music scale embracing the octave range of said piano keys, one signal for each proper note of the scale or 29 signals for the 29 proper notes in 4 octaves; an electrically controlled alarm; circuit means adjustably set to any one of the 15 major keys of music so that the 29 successive notes, of that music key over the 4 octaves embraced by the said 49 piano keys, not only correspond to the successive 29 note signals on said signal scale for the same 4 octave range but also correspond to a certain combination of 29 proper piano keys out of the 49 piano keys embraced by the same 4 octave range, the 20 remaining or improper piano keys representing improper or offkey notes for that particular music key, said circuit means being operative, in that setting, when a proper piano key is depressed, to effect the operation of the proper note signal for the depressed piano key and, when an improper piano key is depressed, to effect the operation of said alarm; manually operable means for setting the selector switch; and means for visually indicating the setting of the selector switch.

Housing

The housing is in the form of an elongated box having a pair of end walls 70, 71, a back wall 72, a corrugated or serrated bottom wall 73 containing spaced blocks 74 which rest on the white piano keys and which are spaced and dimensioned to provide U-shaped arches 75 for the black piano keys, a lower front wall 76 slanting forwardly and upwardly from the bottom wall and another wall 77 forming the upper front and top walls of the housing, this wall 77 slanting from the upper edge of front wall 76 rearwardly and upwardly to the top of the housing and then curving arcuately to the upper edge of the back wall.

The bight of the arches 75 preferably rests upon the black keys. One or more, and preferably all arches fit snugly around the black keys so as to center the device on the keyboard.

The wall 77 preferably is composed of translucent material. Its right end portion may be and preferably is provided with a tabulation of the various music keys or diatonic scales and related information which is better shown in Figure 12. Its left end portion contains an opening or transparent window 78. Its center portion between the tabulation and the window contains a music scale showing the position or location of 29 successive notes in any music key. The space allotted to each note on this scale is preferably composed of the translucent wall material but it may, of course, be made transparent or cut away.

As will be readily understood from an inspection of Figures 2 and 3, when the housing is properly placed or centered on the keyboard, the first bottom wall block 74, at the left end of the housing, will rest on white piano key 16 while the adjacent arch 75 will receive the first black key 17. At the same time, the last block, at the right end of the housing, will rest on white key 64 while the space to the right of that block will accommodate black key 65.

Master and piano key switches

The inner face of the bottom wall of the housing carries 49 normally open piano key switches, one switch for each of the 49 piano keys. These switches are normally open when the housing is operatively positioned on the piano and normally closed when the housing is removed from the piano. The operatively positioned housing also carries a normally closed master switch which is in contact with black key 65. When the housing is removed from the piano, the master switch will normally move to its open position.

The master switch is best shown in Figure 6 and its operation can be understood from an inspection of Figures 5B and 6. It is mounted on the inside bottom wall at the right end of the housing and comprises a stationary upper contact member 80 and a resilient lower contact member 81 both of which are anchored at one end on a block containing insulating material 82 which electrically separates these two contact members. The lower resilient member 81, which is longer than the upper member, curves downwardly slightly out of parallel relationship with the upper member 80. The free end of the lower member is positioned directly over a vertical opening in the bottom wall of the housing and this opening contains a vertically arranged loosely mounted pin 83 having, at its upper end, a head which prevents the pin from falling entirely through the opening. In the lowermost position of the pin, its lower end projects downwardly into the space which receives black key 65. When the housing is operatively positioned on a keyboard, the black key 65 engages pin 83 and moves it upwardly a distance sufficient to engage the lower switch member 81 and move it upwardly into the closed position of the master switch where lower contact 81 engages upper contact 80.

Since all of the normally open piano key switches are constructed and arranged in an identical manner, only one will be described. These switches can be best seen in Figures 5A and 7. As shown in Figure 7, each piano key switch is similar to the master switch except that the relationship of the contact members is reversed. Thus each switch comprises a lower contact member 85 of one length and an upper curved resilient contact member 86 of greater length. Both are anchored at one end on an insulating block 87 in a manner such that the upper member 86 curves downwardly into contact with the lower member 85. The free end of the upper member is positioned over an opening having a headed pin 88 which operates in the same manner as the pin 83 of the master switch. Thus with the housing away from the piano, the piano key switch pin 88 falls permitting the piano switch to close. When the housing is operatively positioned upon the piano keyboard, the pin 88 is raised, through its contact with the corresponding piano key 65, into a position where it engages the upper resilient member 86 and moves it out of contact with the lower contact member 85 into the normally open position of this switch.

From the foregoing it will be understood that the 49 piano keys ranging from 16 through 64 normally hold their corresponding switches in an open position but each key, when depressed, permits that switch to close and, when released, moves it back to its original open position. On the other hand, the master switch is normally held in its normally closed position by black key 65 and, since this key is not within the 4 octave range of this device, it will not be operated in the normal use of this device. However when the housing is removed from the piano, this switch will automatically move to its open position.

Signal scale

The music scale, reproduced on the translucent wall 77 of the housing, graphically illustrates the position of each proper note of any music key. In accordance with the invention, it is desired to correlate the proper piano keys with the proper notes of the music scale; hence this invention contemplates some signaling means for particularly indicating the proper note which a given piano key represents. While various signaling devices might be employed, the easiest and most practical is to provide one in the form of an electric lamp. Accordingly 29 lamps consecutively numbered from 101 to 129 are mounted within the housing in position such that one lamp will be provided for each musical noted and aligned therewith.

Each of the lamps 101 to 129 is mounted on a panel 90 spaced behind the music scale or staff, which is reproduced in Figure 3 on the translucent front wall 77. It slopes upwardly to the right so as to be aligned with the music scale as shown in Figure 3. This panel is fixedly mounted on the housing in any suitable manner. Between panel 90 and front translucent wall 77, the panel carries a series of 29 open-ended cylinders 91, one for each lamp, each cylinder extends over its lamp and up to the corresponding music scale note on front wall 77. This open-ended cylinder 91 is preferably made of opaque material, such as cardboard, and functions to confine the illumination of its lamp to the particular musical scale note which its lamp represents.

Furthermore, I propose to have one set of identical signals for the notes appearing on lines of the music scale and a different set of identical signals for the notes appearing on spaces. With lamps this can be readily accomplished by using green lamps for all notes on lines and red lamps for all notes on spaces. This facilitates the teaching of chords and their inversions in every major key. For example when the chord in root position occurs on lines, the corresponding display notes will all be green, the first inversion will comprise two green notes and one red and the second inversion, one green note and two red notes. Similarly when the chord in root position occurs on spaces, the corresponding display notes will all be red, the first inversion will comprise two red notes and one green note and the second inversion, one red note and two green notes.

Electrically operated alarm

An alarm, responsive to the actuation of improper piano keys in any given music key, may take a variety of forms. A conventional buzzer may be, and preferably is, employed. This buzzer, as indicated at 93, may be suitably mounted in any available space within the housing. As shown, it is mounted on the inner face of the rear wall 72.

Circuit means generally

The circuit means includes: a power connection; a pair of power lines leading from that connection; a series of 29 parallel branch circuits extending from one power line to the other, each branch circuit including, for any given music key, a signal indicator, a selector switch and the normally open piano key switch corresponding to that particular signal indicator in that particular music key; and a series of 20 auxiliary circuits, one for each improper piano key, all auxiliary circuits extending from one power line through buzzer 93 to a common terminal with each auxiliary circuit extending in parallel from that common terminal to the other power line and including, for any given music key, a selector switch and a normally open piano key switch corresponding to an improper note in the given music key.

The power connection may, of course, be in the form of a conventional plug for electrically connecting this device to the regular source of electrical power. Preferably the power connection is in the form of a pair of dry cell batteries 95 connected in series or parallel.

The power lines comprise lead lines 96 and 97 extending from battery 95. Lead line 96 extends to one side of all lamps 101–129 and also to one terminal of the buzzer 93 so that it is connected through the buzzer to the common terminal of the buzzer. The other lead line 97 extends from the battery to the upper contact 80 of the master switch and serially through the master switch to one side of all piano key switches, this side being connected to the lower contact member 85 of each piano key switch. Preferably this side of the battery and of the piano key switches is grounded so that lead line 97 constitutes the ground connection.

The selector switches, used in each parallel branch circuit and in the parallel portion of each auxiliary circuit, are all assembled into a single selector switch assembly.

Selector switch assembly

As best shown in Figures 8 and 11, the mounting for the assembly of selector switches comprises: a spaced pair of upper and lower cross insulating bars 98 and 99 mounted on a suitable metal backing which is secured to the rear wall of the housing; and an intermediate insulating cross bar 100 slideably mounted between bars 98 and 99 for movement along said bars through a range of 15 fixed positions corresponding to the 15 keys of music, the bar 100 being separated from the metal backing by one or more interposed metal roller bearing assemblies 100*a*.

The selector switch assembly comprises: a succession of 29 signal contacts 101*a* to 129*a* fixedly mounted upon the upper bar 98, one contact for each lamp, each contact being electrically connected to the corresponding lamp; a succession of 49 piano key contacts 16*a* to 64*a* fixedly mounted on the lower cross bar 99, one contact for each normally open piano key switch, each contact being electrically connected to the upper contact 86 of the corresponding piano key switch; a succession of 35 or more bridging contacts fixedly mounted on the intermediate insulating bar 100 in a positional pattern such that, when the selector is set for the major key of C, each one of 29 successive bridging contacts numbered 201 to 229 operates to connect one contact, of the 29 proper piano key contacts, to its corresponding and proper signal contact and, when the selector is set for any one of the other 14 major music key positions of bar 100, all 29 of the successive bridging contacts operate to connect the proper combination of piano key contacts, each to the appropriate signal contact; and a succession of 25 auxiliary contacts also fixedly mounted on the intermediate insulating bar 100 in a positional pattern such that, when the selector is set for the major key of C, each one of 20 successive auxiliary contacts numbered 230 to 249 operates to connect one contact, of the 20 improper piano key contacts, to the common terminal of the buzzer and, when the selector is set for any one of the other 14 major music key positions of bar 100, all 20 of the successive auxiliary contacts operate to connect the proper combination of 20 improper piano key contacts, each to the common terminal of the buzzer.

In this latter connection, reference to Figure 8 will make clear that one auxiliary contact is electrically connected to an L-shaped metal bus bar 250 extending around the bottom and back of bar 100. This bus bar 250 is similarly connected to all other auxiliary contacts and to the common terminal of buzzer 93.

Before passing, it may be noted that reference has been made to the 29 signal contacts as being numbered left to right from 101*a* to 129*a*, the 49 piano key contacts from 16*a* to 64*a*, 29 successive bridging contacts from 201 to 229 and 20 successive auxiliary contacts from 230 to 249. Not all of these reference numbers necessarily appear on the drawing but they are mentioned to make it possible to refer to specific contact members whenever necessary.

The pattern of bridging and auxiliary contacts shown in Figure 9 is large enough to embrace slightly more than one full octave. The pattern, formed by bridging contacts 201–208 and auxiliary contacts 230–234, which embrace one full octave in the major key of C, is repeated for each successive octave embraced by this device.

*Means for setting selector switch*

Manually operated means are provided to move the selector switch to any one of its 15 different positions corresponding respectively to the 15 different keys of music. This means is best shown in Figure 11 together with Figure 5A.

With reference particularly to Figure 11, it should be noted that my device carries a knob 140 mounted on shaft 141 which is rotationally carried by the housing. The shaft 141 carries a relatively small gear 142 which meshes with large gear 143 on one end of shaft 144, the opposite end of which carries small gear 145. Gear 145 meshes with rack 146 mounted on one end of bar 100. With this mechanism the rotation of the knob in one direction or the other moves the bar accordingly.

*Selector position indicating means*

In order to indicate each different position of the selector bar 100, a tape 150 is wound upon a pair of spools 151 and 152, the spool 151 being carried by shaft 141 and spool 152 being carried by shaft 153, this shaft also being mounted on the housing. The tape 150 is divided into 15 consecutive music key sections numbered 1 through 15 to correspond with the 15 different music keys or diatonic scales. Each section bears data to indicate the particular music key which it represents. The selector switch is positioned in a particular music key when that section of the tape, which bears the data for that particular key, is aligned with the window 78 in front wall 77 of the housing. The music key number thus appearing in the window is listed in Figure 12. Accordingly, when the tape 150 is moved to music key number 1, the selector switch is set to the major key of C.

It will be noted that spool 151 is positively driven through the operating knob 140 in both winding and unwinding directions. The other spool 152 is spring wound or loaded as the operating spool 151 is turned in the tape winding direction. When the operating spool 151 is turned in the opposite or tape unwinding direction, the loaded spring of spool 152 will operate to turn spool 152 and thus wind the tape about it. This spring winding mechanism is not shown but it should suffice to say that it is of a conventional type including a helical spring encircling shaft 153 with one end of the spring secured to the housing and the other end thereof secured to the spool.

*Operation*

The operation can be more readily explained from Figure 15, which schematically illustrates the circuits for one octave with the selector set for the major key of C, which is the No. 1 key. In this key all of the white keys are proper keys while all of the black keys are improper keys. Figure 15 shows the circuits for 8 depressed white keys beginning with key 16 and ending with key 28 and for 5 undepressed black keys included in that same series.

When a given white key such as 16 is depressed, it closes its normally open switch contacts 85 and 86 to establish a circuit extending from one side 97 of the line, which for clarity, is shown as a grounded side, successively through its normally open (but now closed) switch, piano key contact 16a, bridging member 201, signal contact 101a and signal lamp 101 to the other side 96 of the line. Now if a black key, such as key 17 is depressed, it closes its normally open switch contacts to establish a circuit extending from the same grounded side 97 of the line successively through that normally open switch, piano key contact 17a, auxiliary contact 230, L-shaped bus bar member 250, to the common terminal of the buzzer 93 and thence through the buzzer to the other side 96 of the power line.

The relationship of proper and improper piano keys to note signals or signal lights, for certain major keys of music is shown in Figure 13. Here it will be seen that, when the device is set for the major key of C, white piano key 16 controls and corresponds to light 101, black piano key 17 corresponds to the buzzer, white key 18 to light 102 etc.

Now if we reset the selector switch for the major key of G, which is the No. 7 key, then the only change, in the octave beginning with white key 16 and ending with white key 28, is that white key 21 becomes an improper key and black key 22 becomes a proper key. From this it will be clear that signal indicator or light 104 is operated by white key 21 in the key of C and by black key 22 in the key of G.

Figure 13 also indicates that the major keys of D and A, which are the No. 13 and No. 5 keys respectively and their corresponding octaves, begin with black key 17 instead of white key 16 and ends with black key 29 instead of white key 28. Thus in switching from the key of G to the major key of D, white keys 16 and 28 become improper keys and their places are respectively taken by black keys 17 and 29 which now operate lights 101 and 108 respectively. In switching from the major key of D to the major key of A, white key 23 becomes an improper key and black key 24 becomes a proper key for light 105.

Figure 13 thus makes clear that one particular note in the music scale and the light corresponding to that note do not always correspond to the same piano key. In other words the electrical connection for a certain light will change from one piano key in one key of music to another piano key in a different key of music. The design of the selector switch in this case is therefore such as will shift the electrical connection from one piano key to another as required by given shift from one music key to another.

Figure 14 shows the shift in relationship, between piano keys and bridging and auxiliary contacts, when the selector mechanism is shifted from one key to another. Thus, in the key of C, piano key 16 controls light 101 through bridging contact 201. In the key of G it continues to control light 101 but now through bridging contact 204. In the key of D, light 101 is controlled by piano key 17 through bridging contact 207. In the key of A piano key 17 continues to control light 101 but now through bridging contact 203.

*Modification*

My device may be provided with a series of pivotally movable false piano keys simulating those keys of a piano keyboard which the device is intended to embrace and these false keys used to operate the piano key switches. An arrangement of this character is not illustrated since its appearance would be substantially the same as that shown in at least Figures 1 and 2 of the drawings. With false keys of this character the device may be used to teach music without requiring a piano.

Having described my invention, I claim:

1. A teaching device for a keyboard instrument comprising: a series of operating elements adapted to have contacting engagement with a substantial number of the keys of the instrument; a series of distinctive signal means representing the notes of a diatonic scale; and shiftable control means between said operating elements and said signal means, whereby when said control means is shifted to different positions with respect to the operating elements, a different diatonic scale will cause actuation of said signal means.

2. The teaching device of claim 1 comprising: an alarm; and said shiftable control means being between said alarm and said operating elements, whereby when said control means is shifted to a given diatonic scale position, the playing of the improper instrument keys for that given diatonic scale will operate said alarm.

3. The teaching device of claim 1 for use with a piano wherein: said signal means includes a display means visually portraying a music staff and a succession of signalling elements each operative, when actuated, to indicate visually the specific location on said staff of a different staff note and a corresponding succession of staff notes extending over a desired music range embracing one octave.

4. The device of claim 3 wherein: certain signal elements are operative, when actuated, to render their particular staff notes distinguishable from the particular staff notes of certain other signaling elements.

5. The device of claim 3 wherein: each signaling element is in the form of an electric lamp positioned to illuminate its staff note when actuated.

6. The device of claim 3 wherein: said operating elements and said control means are in the form of electric circuit means having, for each different piano key, a control switch adapted to be controlled by its piano key for operation thereby, and also having, for each different staff note, a separate branch circuit containing, in a given diatonic scale, the control switch of the piano key for that particular staff note.

7. The device of claim 6 wherein: said control means contains a selector switch mechanism which may be set to different positions corresponding to different diatonic scales, said mechanism being operable, in each diatonic scale position to which it may be set, to connect into each branch circuit for a particular staff note, the control switch of the piano key for that staff note in the corresponding diatonic scale.

8. The teaching device of claim 1 for use with a piano key board wherein: said signal means includes means portraying successive full space and line notes in a music staff over a desired music range embracing one octave more or less and a separate staff note signalling element for each different staff note, each element being operative, when actuated, to render its staff note visually distinctive; said operating elements include a separate control switch for each piano key embraced within said desired music range, each switch being adapted to be controlled by its piano key so as to move therewith between operative and inoperative positions corresponding to depressed and undepressed piano key positions; and said control means includes circuit means adjustable to different positions respectively corresponding to different diatonic scales and operative, in each position, to connect the control switches of those proper piano keys, which in the set diatonic scale correspond to successive staff notes, respectively to the signalling elements for such staff notes so as to correlate each staff note with the piano key which is the proper key for that note in the set diatonic scale, said circuit means being further operative, and when it is set to a given diatonic scale and when the control switches are operatively controlled by their respective piano keys, to actuate the signalling element for a given staff note in response to the operation of the proper piano key for that note.

9. The device of claim 8 wherein said portraying means comprises: a visual display surface with said music staff reproduced thereon.

10. The device of claim 9 wherein: said display surface is provided by a translucent wall; and said signaling elements are in the form of electric lamps placed along one face of the translucent wall in position to illuminate their respective staff notes when actuated.

11. The device of claim 8 wherein: said control switches are mounted on a supporting structure which is adapted to be placed over the piano keys embraced by said music range with each control switch operatively positioned in relation to its piano key; and an operating member for each switch is provided to extend from said structure into contact with the corresponding piano key.

12. The device of claim 11 wherein: said switch supporting structure is removable from said piano keys; and said device includes a power connection for said circuit means and a master switch controlling said power connection, said master switch having an operating member positioned to engage the piano when said supporting structure is operatively positioned on the piano keys, and, through such engagement, move the master switch to its closed position, said master switch moving to its open position when said device is removed from said piano keys.

13. The device of claim 8 wherein said circuit means includes: a selector switch shiftable to different positions corresponding to different diatonic scales and being operative, when shifted from one diatonic scale position, involving one combination of control switches for a corresponding combination of proper piano keys, to a different position, involving a different combination of control switches for a correspondingly different combination of proper piano keys, to shift the control switch connections to the proper combination for the newly set diatonic scale.

14. The device of claim 8 wherein said circuit means includes: a pair of power lines leading to a power connection; a series of parallel electric branch circuits, one for each signaling element, each branch circuit extending from one power line to the other and inluding therebetween its signaling element, a selector switch assembly and the control switch of the corresponding piano key for the diatonic scale to which the circuit means is set.

15. The device of claim 14 wherein said selector switch assembly includes: a series of element contacts, one for each signal element and electrically connected thereto; another series of key contacts, one for each proper and improper piano key control switch and electrically connected thereto; and a selector member presenting, in each adjusted position of said circuit means, a series of bridging contacts, one connecting each element contact to the corresponding key contact for the proper piano key control switch.

16. The device of claim 8 including: an alarm for the improper piano keys, which in a given diatonic scale do not correspond to said staff notes; said circuit means connecting the control switches of the improper piano keys to said alarm and being operative to actuate the alarm in response to the operation of an improper piano key.

17. The device of claim 16 wherein said circuit means includes: a pair of power lines leading to a power connection; a series of parallel electric branch circuits, one for each signaling element, each branch circuit extending from one power line to the other and including therebetween its signaling element, a selector switch assembly and the control switch of the corresponding piano key for the diatonic scale to which the circuit means is adjusted; a connection leading from one power line through said alarm to a common terminal; a series of parallel electric auxiliary circuits, one for each improper piano key, each auxiliary circuit extending from said common terminal to the other power line and including therebetween said selector switch assembly and the control switch of its improper piano key.

18. The device of claim 17 wherein said selector switch assembly includes: a series of element contacts, one for each signal element and electrically connected thereto; another series of key contacts, one for each proper and improper piano key control switch and electrically connected thereto; and a selector member presenting, in each adjusted position of the circuit means, a series of bridging contacts, each connecting an element contact to the corresponding key contact for the proper key control switch, and also having a series of auxiliary contacts, each connecting a key contact, for an improper piano key control switch, to said common alarm terminal.

(References on following page)

References Cited in the file of this patent

UNITED STATES PATENTS

| | | |
|---|---|---|
| 255,979 | Hauschel | Apr. 4, 1882 |
| 2,175,944 | McGrath | Oct. 10, 1939 |
| 2,193,335 | Lamp | Mar. 12, 1940 |
| 2,547,535 | Pierce et al. | Apr. 3, 1951 |

FOREIGN PATENTS

| | | |
|---|---|---|
| 451,411 | France | Feb. 13, 1913 |
| 68,791 | Sweden | Dec. 3, 1927 |